(12) United States Patent
Zhu et al.

(10) Patent No.: US 11,941,033 B2
(45) Date of Patent: Mar. 26, 2024

(54) METHOD AND SYSTEM FOR SYNTACTIC SEARCHING

(71) Applicant: Affirm, Inc., San Francisco, CA (US)

(72) Inventors: Qi Zhu, Toronto (CA); Sean Weisman, Toronto (CA); Gregory Ward, Toronto (CA); Alishan Ladhani, Toronto (CA); Jeff Li, Toronto (CA)

(73) Assignee: Affirm, Inc., San Francisco, CA (US)

( * ) Notice: Subject to any disclaimer, the term of this patent is extended or adjusted under 35 U.S.C. 154(b) by 103 days.

(21) Appl. No.: 16/767,017

(22) PCT Filed: Nov. 27, 2018

(86) PCT No.: PCT/CA2018/051501
§ 371 (c)(1),
(2) Date: May 26, 2020

(87) PCT Pub. No.: WO2019/100167
PCT Pub. Date: May 31, 2019

(65) Prior Publication Data
US 2020/0320113 A1  Oct. 8, 2020

Related U.S. Application Data

(60) Provisional application No. 62/590,748, filed on Nov. 27, 2017, provisional application No. 62/590,740, filed on Nov. 27, 2017.

(51) Int. Cl.
| | | |
|---|---|---|
| *G06F 16/33* | (2019.01) | |
| *G06F 16/31* | (2019.01) | |
| *G06F 16/338* | (2019.01) | |
| *G06F 16/35* | (2019.01) | |
| *G06F 40/205* | (2020.01) | |
| *G06F 40/40* | (2020.01) | |

(52) U.S. Cl.
CPC .......... *G06F 16/3344* (2019.01); *G06F 16/31* (2019.01); *G06F 16/338* (2019.01); *G06F 16/353* (2019.01); *G06F 40/205* (2020.01); *G06F 40/40* (2020.01)

(58) Field of Classification Search
CPC .... G06F 16/31; G06F 16/3344; G06F 16/338; G06F 16/353; G06F 40/205; G06F 40/40
See application file for complete search history.

(56) References Cited

U.S. PATENT DOCUMENTS

| | | | |
|---|---|---|---|
| 10,380,204 B1* | 8/2019 | Wilson | G06F 16/9535 |
| 2003/0233251 A1* | 12/2003 | Haskell | G16H 40/60 705/2 |
| 2008/0177731 A1* | 7/2008 | Matsuzaki | G06F 16/353 707/999.005 |
| 2009/0112848 A1* | 4/2009 | Kunjithapatham | G06F 16/90324 707/999.005 |
| 2009/0144262 A1* | 6/2009 | White | G06F 16/242 |

(Continued)

*Primary Examiner* — Matthew J Ellis
(74) *Attorney, Agent, or Firm* — Burr & Forman LLP

(57) ABSTRACT

The disclosure is directed at a method and system for improved search functionality. By using natural language processing (NLP), individual words in a search term may be parsed and then individually stored. The relationships between the individual words of the search term may also be stored such that when the search is repeated, the previous results may be retrieved and, if not, a more accurate search may be performed.

18 Claims, 8 Drawing Sheets

Adidas Tanjun (Black/White) Men's Running Shoes

(56) References Cited

U.S. PATENT DOCUMENTS

| | | | |
|---|---|---|---|
| 2011/0010367 A1* | 1/2011 | Jockish | G06F 16/334 |
| | | | 707/733 |
| 2012/0290622 A1* | 11/2012 | Kumar | G06F 16/9535 |
| | | | 707/E17.014 |
| 2014/0188935 A1* | 7/2014 | Vee | G06F 16/248 |
| | | | 707/771 |
| 2016/0162502 A1* | 6/2016 | Zhou | G06F 16/3322 |
| | | | 707/722 |
| 2017/0235799 A1* | 8/2017 | Miller | G06F 16/332 |
| | | | 707/722 |

* cited by examiner

| Entity | Adjectives | Root Nouns |
|---|---|---|
| Samsung® | 4K<br>LED<br>Curved | Television |
| LG® | 4K<br>LED<br>Curved | Television |
| LG® | LED<br>Flat | Television |
| LG® | LED | Projector |
| Sony® | LED<br>Curved | Television |
| Nike® | Red | Basketball Shoes |

Figure 3

Nike Tanjun (Black/White) Men's Running Shoes
Figure 7a
Nike Tanjun (Black/White) Men's Running Shoes
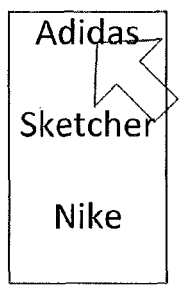
Figure 7b
Adidas Tanjun (Black/White) Men's Running Shoes
Figure 7c

METHOD AND SYSTEM FOR SYNTACTIC SEARCHING

CROSS-REFERENCE TO OTHER APPLICATIONS

The current application claims benefit from U.S. Provisional Application Nos. 62/590,748 and 62/590,740, both filed Nov. 27, 2017, the contents of which are hereby incorporated by reference.

FIELD

The disclosure is generally directed at online searching and more specifically, at a method and system for syntactic searching.

BACKGROUND

Use of the Internet continues to grow at a rapid pace along with the introduction of different enhancements and ways to interact with the Internet. Users can now perform many different functionalities over the Internet. These functions include, but are not limited to, booking vacations, making purchases, marketing products or services and reading the news. In most of these cases, interaction with the Internet for a user begins with a search for relevant information.

Currently, when a user searches for information, search engines perform the search in the background and then presents, or displays, the results on a display screen to the user. In some current systems or searching platforms, the information that is returned may not be relevant or may not be what the user is looking for.

Therefore, there is provided a novel method and system for syntactic searching that overcomes some disadvantages of current searching functionality.

SUMMARY

The disclosure is directed at a method and system for syntactic searching. As disclosed below, the system and method of the disclosure uses natural language processing (NLP) parsing.

In one embodiment of the disclosure, a search term is parsed, via NLP parsing, and the individual words within the search term are then assigned into different categories based on the NLP parsing. This may be seen as syntactic tagging. A check is then performed to see if the search term has been previously searched by comparing the tagged search term with previously indexed content. In one embodiment, this is performed by the comparing the parsed words in the search term with previously assigned syntactic tags within the indexed content. The indexed content may include, but is not limited to, previously tagged search terms or from data inputted from external sources, such as merchant product catalogs. If the search (or the search term) has not been previously performed, the parsed words of the search term are then stored in a database along with the results of the search. In one embodiment, when the parsed words are stored, they are stored independently, however, they are associated with each other. If the search has previously been performed, the previous results are retrieved.

An improvement of the current disclosure is that each word of a search term is compared with previously stored database results such that more relevant search results are retrieved and displayed to the user. Another improvement of the disclosure over current systems is that the disclosure takes advantage of current technology to improve the search results provided to a searcher.

In another embodiment, the disclosure is directed at a method and system for improved searching functionality. In one embodiment the disclosure is directed at a method and system that allows a user to change search terms within a search window (or search string) instead of having to re-enter a new search term by using NLP parsing. By separating a search string into separate components or individual words, the ability to manipulate the search term is facilitated.

An improvement of the current disclosure is that each word of a search term is seen as an individual component of the search term rather than seeing the search term as a single string.

In one aspect of the disclosure, there is provided a method for syntactic searching including receiving search term from user input; parsing individual words in the search term using natural language processing (NLP); comparing the parsed individual words with words stored in a NLP database; and displaying search results based on comparison of words stored in the NLP database.

In another aspect, displaying search results includes retrieving previously stored search results if parsed individual words are stored in the NLP database; and displaying the previous search results. In another aspect, displaying search results includes performing a search based on the search term if the parsed individual words are not stored in the NLP database to generate new search results; and displaying the new search results. In yet another aspect, the method further includes storing the parsed individual words in the NLP database; storing the new search results in the NLP database; and associating the new search results with the parsed individual words.

In a further aspect, the method further includes storing the search term in the database. In another aspect, comparing the parsed individual words includes grouping the parsed individual words; and comparing the group of parsed individual words with the words in the NLP database. In an aspect, comparing the group of parsed individual words includes comparing the parsed individual words with the words in the NLP database; and determining if the words in the NLP database have relationships with other words in the NLP database associated with the group of parsed individual words. In another aspect, displaying search results includes retrieving previously stored search results if the words in the NLP database have identical relationships with other words in the NLP database associated with the group of parsed individual words; and displaying the previous search results. In yet a further aspect, displaying search results includes performing a new search based on the search term if the words in the NLP database do not have identical relationships with other words in the NLP database associated with the group of parsed individual words to generate new search results; and displaying the new search results.

In another aspect of the disclosure, there is provided a computer-readable medium having stored thereon computer executable instructions, that, if executed, cause a computer system to receive a search term from user input; parse individual words in the search term using natural language processing (NLP); compare the parsed individual words with words stored in a NLP database; and display search results based on comparison of words stored in the NLP database.

In another aspect of the disclosure, there is provided a method of improving online search functionality including sensing user selection of a word within a search term;

retrieving a list of words associated with the word based on natural language processing (NLP); and displaying the list of words to a user.

In another aspect, the method of improving online search functionality further includes sensing user selection of a replacement word from the list of words; and replacing the word with the replacement word within the search term to generate a new search term. In another aspect, the method further includes performing a search based on the new search term. In a further aspect, the list of words are stored in a semantic tree.

DESCRIPTION OF THE DRAWINGS

Embodiments of the present disclosure will now be described, by way of example only, with reference to the attached Figures.

FIG. 3 is a table showing another embodiment of how information is stored in a database;

FIGS. 7a to 7c are schematic diagrams of one embodiment of updating a search term.

DETAILED DESCRIPTION OF THE EMBODIMENTS

The disclosure is directed at a method and system for syntactic searching. In one embodiment, the method and system of the disclosure uses natural language processing (NLP) for syntactic searching and/or for improving searching functionality. NLP is used to parse words either individually or within a group of words, seen as a search term and/or phrase. NLP parsing takes an individual word or each word within a phrase and parses the phrase to assign categories, also known as deep parsing, for each of the individual words. As a result, the parsed search term is annotated and includes syntactic information.

In a preferred embodiment, the syntactic information that is used in the system and method of the disclosure relates to dependency (how words depend on each other) and co-reference information. In one embodiment, categories that the words are assigned into may include, but are not limited to, symbols, adjectives, root nouns, numbers, nouns, proper nouns, verbs, adverbs and prepositions. The categorization of the words may depend on a context of usage of the words. Other categories, such as those listed at https://sites.google.com/site/partsofspeechhelp/hom/#TOC-Part-of-Speech-Tags are also contemplated. By taking advantage of the machine learning that a NLP parser has previously gained, search functionality, or more specifically, online search functionality, can be improved.

After the phrase has been parsed, the individual words may be stored in a database along with their category or categories, such as in the form of a syntactic tag. In some examples, words may fall under multiple categories. For instance, in the phrase "dog tag", the word "dog" may be categorized as an adjective and the word "tag" categorized as a root noun, however, the word "dog" can also be categorized as a root noun when used in a different search term or context. In this embodiment, the noun "dog" and the compound noun "dog" may be stored in different indices or indexes so that when searches are performed each instance of the word "dog" can be treated differently based on the context that the word is being used and therefore, improve the accuracy of the search results.

As another example, with the search term "blue dog tag", the word "blue" may be categorized or tagged as an adjective, the word "dog" may be categorized or tagged as a compound noun and the word "tag" may be categorized or tagged as a root noun with all three words stored in different indices based on the syntactic differences. However, if the search term "happy dog" is parsed, the word "happy" is tagged as an adjective and the word "dog" is tagged as a root noun. In this situation, the two occurrences of the word "dog" have no overlap.

Along with being stored with their assigned category or categories, the words may also be connected with each other such that the words may be seen as being associated with each other. This will be described in more detail below.

Figure 1:
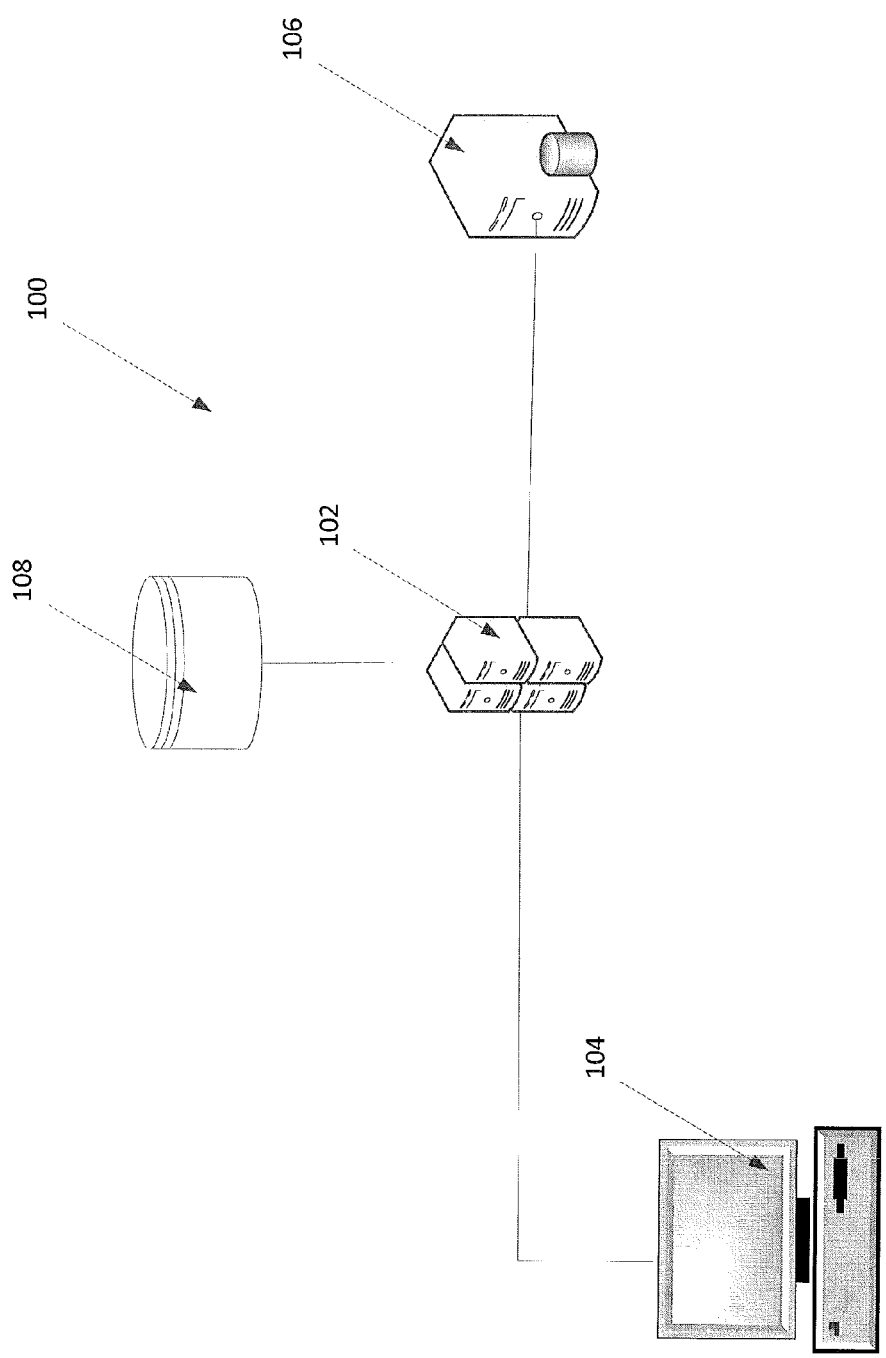
FIG. 1 is a schematic diagram of a system for syntactic searching.

Turning to FIG. 1, a system for improving search functionality is shown. The system 100 includes server 102 that receives a search request, such as in the form of a search term or phrase, from a user or searcher (seen as computer 104). It will be understood that although the computer 104 is used to reflect a user in FIG. 1, the user may access the server 102 via other devices such as, but not limited to, a laptop, a tablet, a handheld mobile device, a Smartphone™ and the like. The different type of devices that can access the server 102 will be well understood.

The server 102 interacts, or is connected, with a NLP server 106 or NLP database server that may or may not be part of the system 100. The NLP server 106 may parse the search term, such as one that is provided by the server 106 and then retrieves the categories of the parsed words within the search term. In one embodiment, the NLP server 106 may be integrated with the server 102. In one embodiment, the NLP server 106 parses the search term to categorize, or tag, the individual words or combination of words (or both) within the search term. In the following description, although the specification refers to individuals words within the search term, the same follows for a combination of words.

In order to populate a search term database 108 (for use in future searches), the individual words of the search term (and their determined, or tagged, categories) are stored in the search term database 108 along with an indicator, if necessary, that there is a relationship/association between an individual words with other individual words such as those categorized from the same search term. The continued storage of additional parsed words from search terms along with their relationships assists to improve search functionality.

Along with the storing of individual categorized words in the search term and the relationship between words in the search term, the search results resulting from the searches may also be stored in the database 108. In another embodiment, the search term database 108 or server 102 may categorize the words into different semantic trees whereby the words can be categorized with other like, or similar, words. For instance, all colors can be collected together in one semantic tree while all types of clothing may be collected in another semantic tree. An example of how information may be stored within the database 108 (such as in semantic trees) is schematically shown in FIG. 2.

Figure 2:
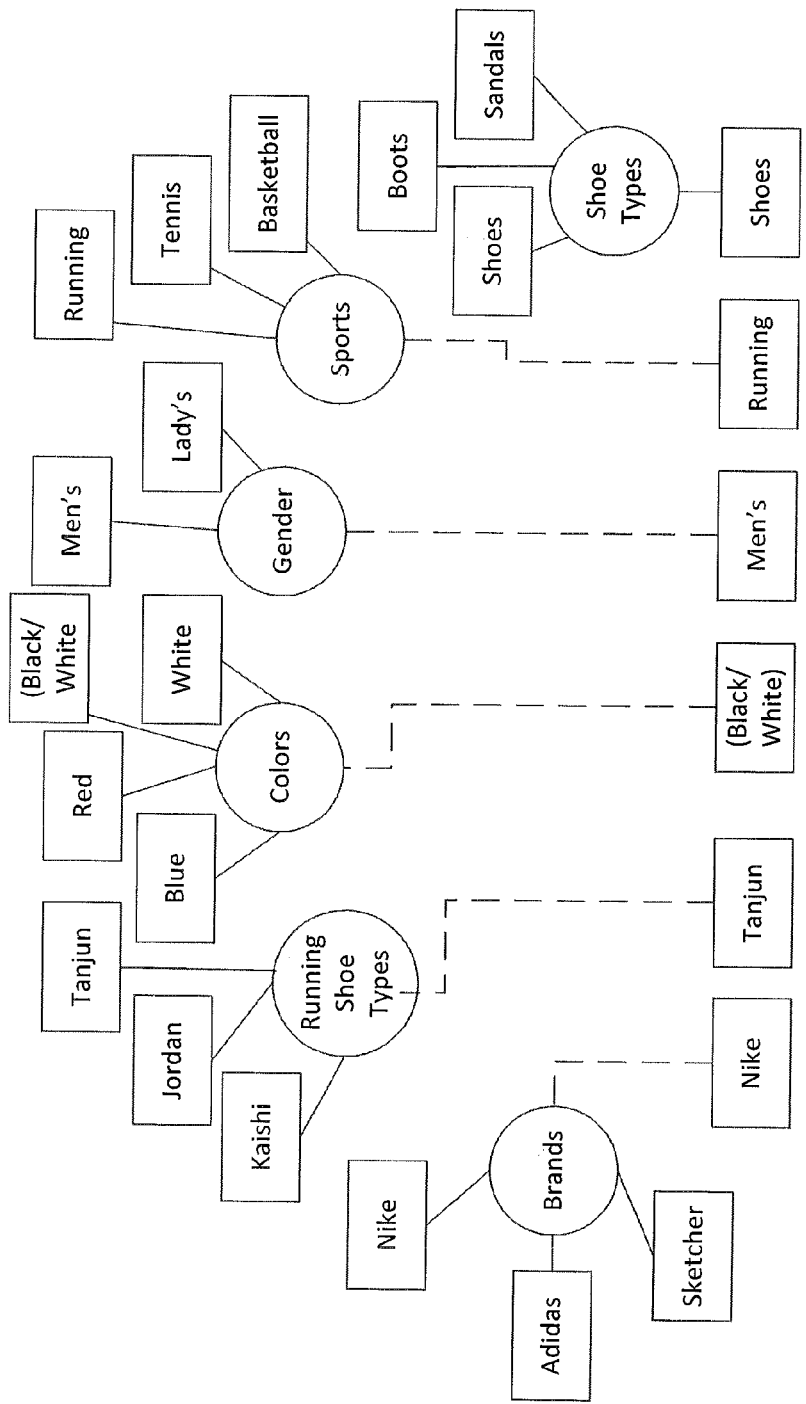
FIG. 2 is a schematic diagram of one embodiment of how information is stored in a database.

Turning to FIG. 2, a schematic diagram of how parsed words may be stored in the search term database 108 is shown. As shown in FIG. 2, groupings of like, or similar, words (seen as semantic trees) are stored together. In another embodiment, the semantic tree categories may be nouns, adjectives, verbs and the like. As will be understood, the storage of these groupings of words may not necessarily be physically together but that they are associated with each other from a category standpoint within the database 108. In one embodiment, pointers are used to connect all of the like words with each other within a semantic tree.

In the current example, the semantic trees can be seen as "Brands", "Running Shoe Types", "Colors", "Gender", "Sports" and "Shoe Types". Within each of the different semantic trees are different words that are associated with the semantic tree grouping or category. These semantic tree categories have been selected for ease of explanation with the description below. It will be understood that the number of semantic trees is limitless and that some words may belong to more than one semantic tree. As outlined above, categories of words not relating to foot apparel are also contemplated. In another embodiment, the words can be combined and seen as being in a compound form for example, "slim fit" or "cold shoulder".

In FIG. 2, the words "Adidas", "Sketcher" and "Nike" are associated with the "Brand" semantic tree; the words "Kaishi", "Jordan" and "Tanjun" are associated with the "Running Shoe Types" semantic tree; the words "Blue", "Red", "Black" and "White" are associated with the "Colors" semantic tree; the words "Men's" and "Lady's" are associated with the "Gender" semantic tree; the words "Running", Tennis" and "Basketball" are associated with the "Sports" semantic tree; and the words "Shoes", Boots" and "Sandals" are associated with the "Shoe Types" semantic tree. It will be understood that the semantic trees may include other terms and the current example should not be seen as being restrictive.

In one example, passing the search term "Nike Tanjun Black/White Running Shoes through an NLP server results in the word "Nike" categorized as an entity and then associated as an entity index and/or "Brand" semantic tree, "Tanjun" categorized as a noun and associated with a noun index and/or "Running Shoe Types" semantic tree, "Black/White" categorized as an adjective and associated with an adjective index and/or "Colors" semantic tree, "Men's" categorized as a noun and associated with a noun index and/or "Gender" semantic tree, "Running" categorized as a present participle verb and associated with a verb index and/or "Sports" semantic tree and "Shoes" categorized as a noun or a plural noun and associated with a noun index and/or "Shoe Types" semantic tree. In each case, search term may already be stored in database and there may not be a need to duplicate the entries. Alternatively, some or all of the individual words may be stored in the database such that the entry may only need to be updated to reflect the relationship between the word and other words in the search term. If the any of the words of the search term has not been associated with a semantic tree, the word may be assigned to one to improve searching.

In the current embodiment, pairs of words within the search may also be categorized as having a relationship or association. For instance, the words "Nike" and "Shoes" may be seen as having a dependency relationship with each other whereby it will be understood that Nike would rarely be searched by itself and therefor the two words may be seen as a single term "Nike Shoes". Furthermore, "Tanjun" and "Men's" may be seen as having a compound relationship with each other whereby the phrase "Tanjun" and Men's" can be indexed together. Also, the words "Men's" and "Shoes" may be seen as having a possessive relationship and the words "Running" and "Shoes" may be seen as having a modify relationship whereby the word Running can be seen as a modifier for the term Shoes.

In another embodiment, the words or search terms may be stored in separate entries, however, as relationships between words are learned, they may be associated with each other, such as via pointers to reduce the amount of storage necessary whereby instead of separate entries for each search term, the words are individually stored along with their relationships to other words.

Alternatively, such as schematically shown in the table of FIG. 3, the information may be stored in the search term database 108 based on how the search term is parsed. In the current Figure, the search relates to televisions. The information may also be stored in the database 108 based on previous searches that were performed.

In FIG. 3, the first set of information can be seen as relating to the search term "Samsung® 4K LED Curved Television" where "Samsung" is categorized as an entity symbol; "4K", "LED", and "Curved" are categorized as adjectives; and "Television" is categorized as a root noun. The second set of information can be seen as relating to LG® 4K LED Curved Television wherein "LG" is categorized as an entity symbol, "4K", "LED", and "Curved" are categorized as adjectives; and "Television" is categorized as a root noun. The third set of information can be seen as relating to LG® LED Flat Television where "LG" is categorized as an entity symbol, "LED", and "Flat" are categorized as adjectives; and "Television" is categorized as a root noun. The fourth set of information can be seen as relating to LG® LED Projector where "LG" is categorized as an entity symbol, "LED" is categorized as an adjective and "Projector" is categorized as a root noun. The fifth set of information can be seen as relating to Sony® LED Curved Television where "Sony" is categorized as an entity symbol, "LED" and "Curved" are categorized as adjectives and "Television" is categorized as a root noun. The sixth set of information can be seen as relating to Nike® Red Basketball Shoes where "Nike" is categorized as an entity symbol, "Red" is categorized as an adjective and "Basketball Shoes" is categorized as a root noun. It will be understood that Basketball Shoes can also be categorized as a relationship between the words "basketball" and "shoes". As such, the different words and their different syntactic tags are then stored into different indexes or indices (as discussed below). In another embodiment, the database may be pre-populated with entries using data from merchants, such as product catalogs. The pre-population of the database may be performed by entering the product terms from merchants and having the product terms parsed and indexed such that the database is filled based on merchant input rather than being based on search term inputs. In an alternative embodiment, the search results for the first set of information search may be stored as an URL.

Figure 4:
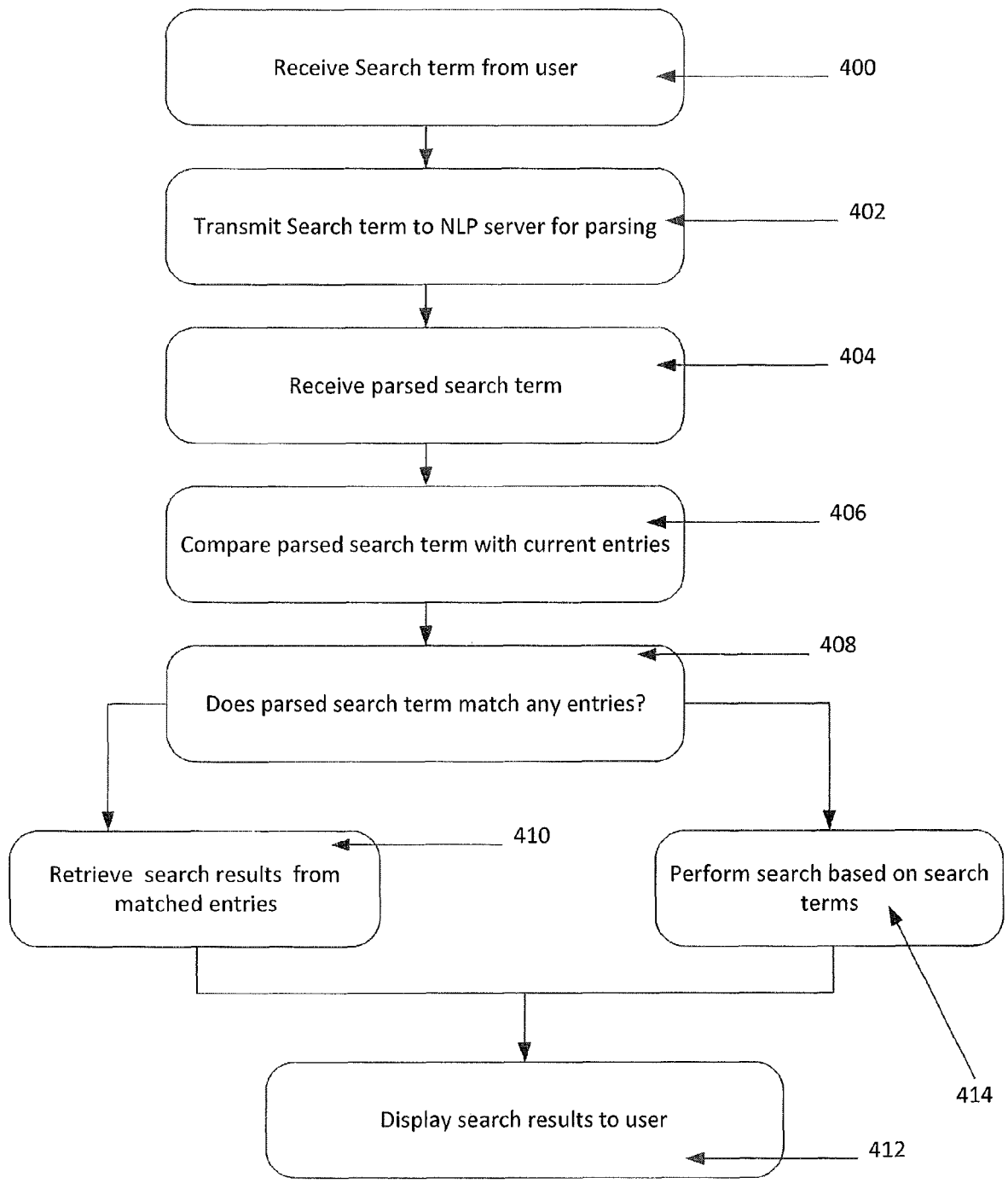
FIG. 4 is a flowchart outlining an embodiment of a method of syntactic searching.

Turning to FIG. 4, a flowchart outlining a method of improving search functionality is shown. It is assumed that the database has already been populated with previous parsed search terms and their search results, such as schematically shown in FIG. 2 or 3.

Initially, a search (in the form of a search term) is received by the server (400). The search term is received from a user, such as via a user device. The search term can then be stored in the database, if desired, as a string or may be stored in the database as individual words that make up a string. The search term can then be processed as required. The search term is then parsed (402). In one embodiment, the search term is transmitted by the server to an NLP database server to be parsed (402). At the NLP database server, the search term is parsed (such as outlined above) to categorize each of the words within the search term. This process will be understood by one skilled in the art. In one embodiment, the parsing performed by the NLP database or NLP database server results in the words of the search term being categorized or classified as symbols, adjectives, root nouns, numbers and/or prepositions. Alternatively, the words may be classified in semantic trees.

After being processed by the NLP database server, the parsed search term is then received by the server (404). When the parsed search term is received by the server, it can then access the database to determine if the search has been previously performed or if searches containing similar, or like, terms have been previously performed. In one embodiment, the server can compare the parsed words to entries in the database to determine if the parsed words or combination of parsed words are stored in any of the entries within the database (406).

A determination is then made to see if the parsed search term matches a current database entry (408). In one embodiment, if the entries are stored in a table (such as in FIG. 3), the determination comparison is performed to see if the search term has an entity equal to "Samsung", adjectives equal to "4K", "LED" and "Curved" and root noun of "Television". In another embodiment, if the words are stored in semantic trees, the comparison is performed to determine if each of the individual words (or combination of words) is stored in the database and that there is a relationship between these entries. If a comparison is determined to be met, the search results from any matched entries are retrieved (410) and then displayed to the user (412). Alternatively, if the parsed search terms do not match any current entry in the database, a search is performed based on the search term (414) and the results displayed to the user (412). In this case, the search results can then be stored in the database in a search results section and the individual words of the parsed search term entered into the other sections as necessary. In this manner, the database can be continually populated with new entries.

As an example (based on the terms in the table of FIG. 3), if a user enters a search term of "Samsung 4K Television", the parsed search terms returned from the NLP database server may be entity="Samsung", adjective(s)="4K" and root noun="Television". In the current example, as can be seen, this combination of search terms can be found in the first entry of the database. As such, the system may display the results that are associated with the first entry in the database.

Currently, with known search systems or platforms, if a search of "Samsung 4K Television" is performed, due to how the searching functionality is performed, the search results may include information that does not relate to the specific search terms. For instance, other brands of 4K televisions may be shown or other 4K products, such as projectors, may be displayed. The system and method of the disclosure improves on current search functionality by showing search results that include the search terms without trying to guess other items that the user may be wanting to see or displaying items the user does not want to see.

The current disclosure provides a method and system for improved searching whereby the results of the search that directly match or are associated with the search term are returned or displayed rather than a general search if there are no matching terms.

In another example, if a user enters the search term "LED Curved Television", the NLP database or NLP database server may parse the search term to categorize "LED" and "Curved" as adjectives and "Television" as a root noun. When the server 102 compares the parsed search term with the database, the server may determine that the search terms can be found in more than one entry. In the current example, the combination of words "LED", "Curved" and "Television" can be found in three entries in the database. For instance, the Samsung 4K LED Curved Television entry, the LG 4K LED Curved Television entry and the Sony LED Curved Television entry all fit the search criteria. In this case, the server may either send the URL(s) of the search results separately to the user or combine the results and send the results in a single list. Other display schemes are also contemplated. The server may also do some further processing of the search results to rank the popularity of the results such that the user can see the most relevant or popular matches to their search criteria.

Alternatively in another embodiment, if a user is searching for a Samsung® 4K LED Curved Television, this search term can be parsed using NLP resulting in, in one embodiment, a series of symbols, adjectives and root nouns. For the current search term, Samsung can be seen as an entity, 4K, LED, and Curved can be seen as adjectives and Television can be seen as a root noun. In some cases, LED may also be seen as a root noun based on how it may be parsed using NLP. If this is so, then the categorization of LED as a root noun may also be stored in the NLP database.

Figure 5:
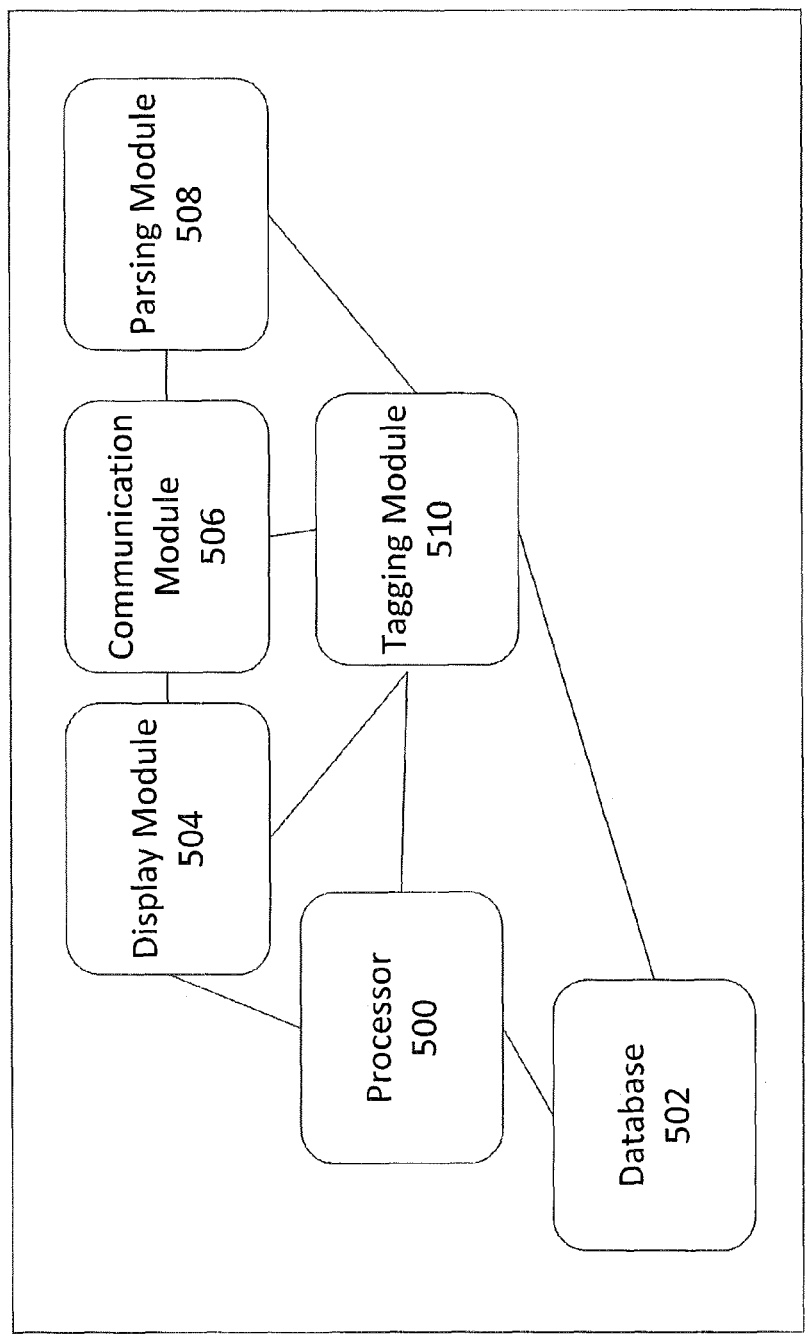
FIG. 5 is a schematic diagram of a system for syntactic searching.

Turning to FIG. 5, a schematic diagram of an embodiment of the server 102 is shown. The server 102 includes a processor 500 along with a database 502 (which may be the database 108 in FIG. 1). The server 102 may further include a display module 504, a communication module 506, a parsing or NLP module 508, a tagging module 510 and a semantics categorizing module 512.

The display module 504 may generate the screens that are displayed on a user's computer, or device, that they are using to interact with the server 102. The communication module 506 may control the server's communication such as between the user (or user device 104) and the server 102 or between the server 102 and other devices, servers or database. The parsing or NLP module 508 may receive the search terms, such as from the communication module, and then parses the search term so that the terms can be tagged by the tagging module 510. Alternatively, the NLP module 508 may communicate with the NLP server to have the NLP server parse the search term and then, after receiving the parsed search term, the NLP module 508 transmits the individual words of the parsed search term to the other modules and/or the database. The tagging module 510 may assist in indexing (or categorizing) the tagged or categorized words and then stores the indexed terms or words in the database 502. As will be understood, the modules may operate independent of the processor 500 or may be controlled by the processor. Furthermore, although all of the modules are shown in a single server, it will be understood that the modules may be distributed over different servers but communicate with each other to achieve the system and method of the disclosure.

Figure 6:
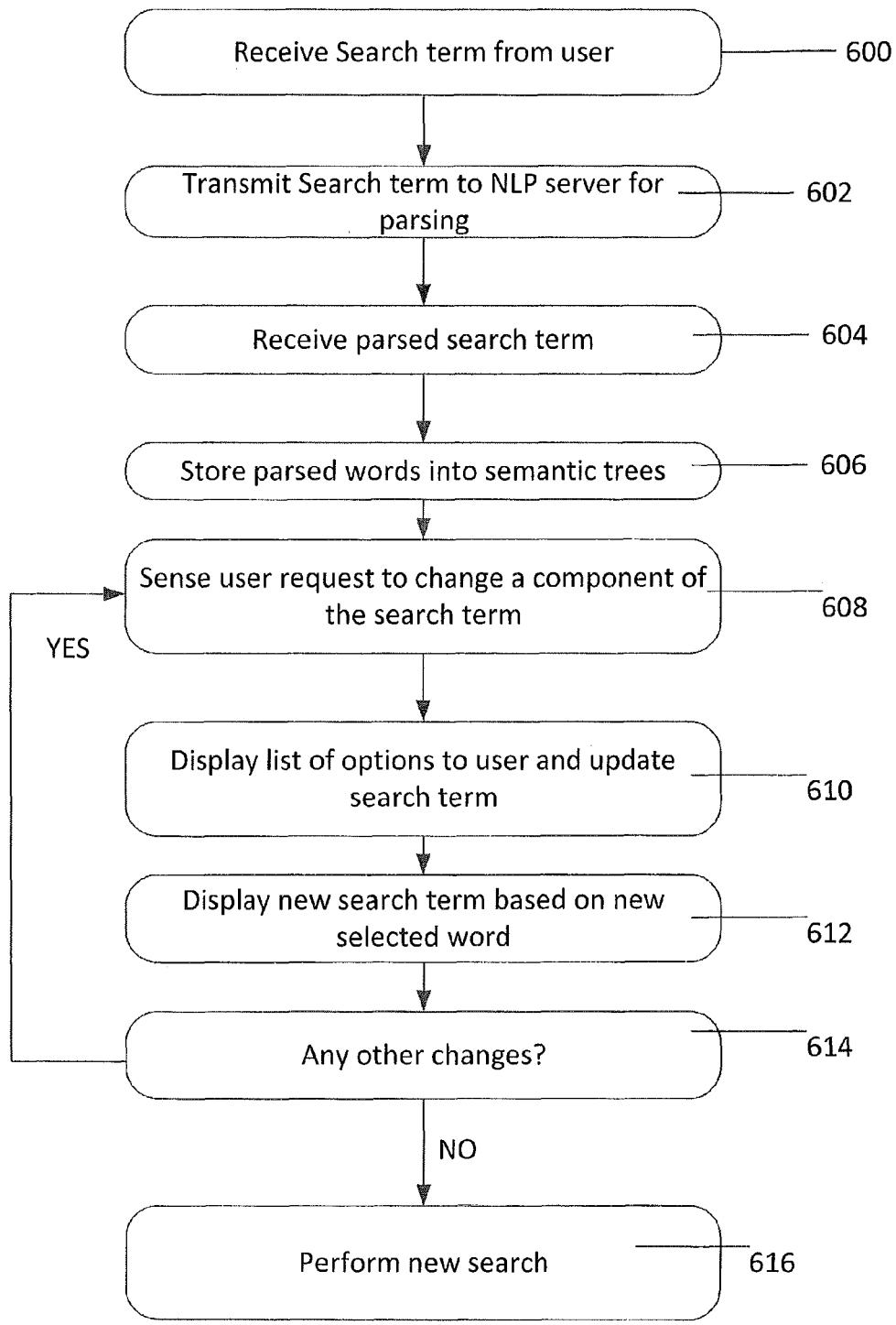
FIG. 6 is a flowchart outlining an embodiment of a method of improved searching.

Turning to FIG. 6, a flowchart outlining a method of improved search functionality is shown. Initially, a search term is received by the server (600). The search term can be processed by the server and then stored in the database as a string, if desired. The search term is then transmitted to a server (602), such as an NLP server, for parsing. The NLP server parses the search term to categorize each word within the search term. For instance, if a user enters a search term of "Nike Tanjun Black/White Men's Running Shoes", the NLP server may parse the search term into "Nike", "Tanjun", "Black/White", "Mens", "Running" and "Shoes". The parsed search term is then received back by the server (604). The server can then store the parsed words in the semantic trees (606) such as schematically shown in FIG. 2. In one embodiment, the server may also compare the parsed words to see if they are already stored in the database and may only update the relationship between the stored word and other of the parsed words.

The server then waits for an indication from a user that the user wishes to change one of the words, or components, of the search term (608), such as via the selection of one of the words in the search term. The sensing may be via a cursor hovering over the word or may be a sensing of the word being clicked by a user. Other ways of sensing the selection of a word are also contemplated including, but not limited to, voice commands. The sensing of the word may also be performed in an augmented reality platform.

The server can then display other options for the selected word (610) such as schematically shown in FIG. 7*a*. In one embodiment, the server retrieves all of the words in the semantic tree associated with the word that has been selected. For instance, if the user has selected the word "Nike", the server may retrieve the other brands in the Brands semantic tree. In a preferred embodiment, the server only retrieves the brands that are also related to or associated with Running Shoes. In this example, based on the semantic trees of FIG. 2, the server may provide the user with the opportunity to replace "Nike" with "Adidas" or "Sketcher" in the search term (schematically shown in FIG. 7*b*).

These two options, along with the original word "Nike" can then be displayed to the user, such as in the form of a drop down menu, or a slide bar, or the like, whereby the user can then replace the word "Nike" in the search term with another selected brand. Any method of listing the options is contemplated. In the current embodiment, the user selects the word, or Brand "Adidas" to replace the word, or Brand "Nike". In one embodiment, if the user changes the brand, the Running Shoe Type may also be updated as Adidas or Sketcher may not have a Tanjun Running Shoe Type. In this embodiment, assuming that the relationships between words are known and stored in the database and that the Running Shoe Type "Tanjun" may only be related to or associated with the brand "Nike", the user may be prompted to select a Running Shoe Type that is associated or related with Adidas. Alternatively, the server may simply remove the running shoe type from the search term whereby the updated search term is "Adidas (Black/White) Men's Running Shoes". By storing the relationships between different words, the search functionality can be improved and also provide a more focussed and easier approach for the user.

As Brands are grouped together in a semantic tree, once it is sensed that a user wishes to change the brand being searched, a listing of all the options within that grouping can be displayed. Similarly, if the server senses that the user has selected or clicked on the word "Running" within the search term, the server can then retrieve the other options stored in the Sports semantic tree and display them to the user for selection and replacement of Running in the search term. Similar actions may be performed if any of the other components of the search term is selected.

Based on the selection by the user, the server updates the search term accordingly (612) whereby the new search term may be Adidas Black/White Men's Running Shoes (schematically shown in FIG. 7*c*). As such, the user is provided an improved method of changing a search without having to re-enter a new search term based on the syntactic searching method discussed above.

The server can then determine if the user wishes to change other words within the search term (614). If further changes are requested, the server senses the user request (608) and then displays the options for the selected component (610) and then updates the search term based on the user's selection (612). If there are no further changes, the server waits for an indication from the user, such as the clicking of an Enter key (or Search button) that the updated search term is complete and then performs a search based on the new search term (616). In one embodiment, the system may performed a check to see if the updated search term has been previously searched whereby previous results may be displayed instead of a new search being performed.

In another example, with respect to sensing a desire to change a word in the search term, if there is a chat interface, the following conversation may take place:

User: "Search System, I am interested in a new Samsung 4K TV." (Search term—Samsung 4K TV)

User: "Search System, what other brands do you have?" (Retrieve words from "Brands" semantic tree)

Search System: "The most popular brands are Samsung, L G and Sony, which one do you want to see?" (Display or verbalize the words from the "Brands" semantic tree)

Figure 8:
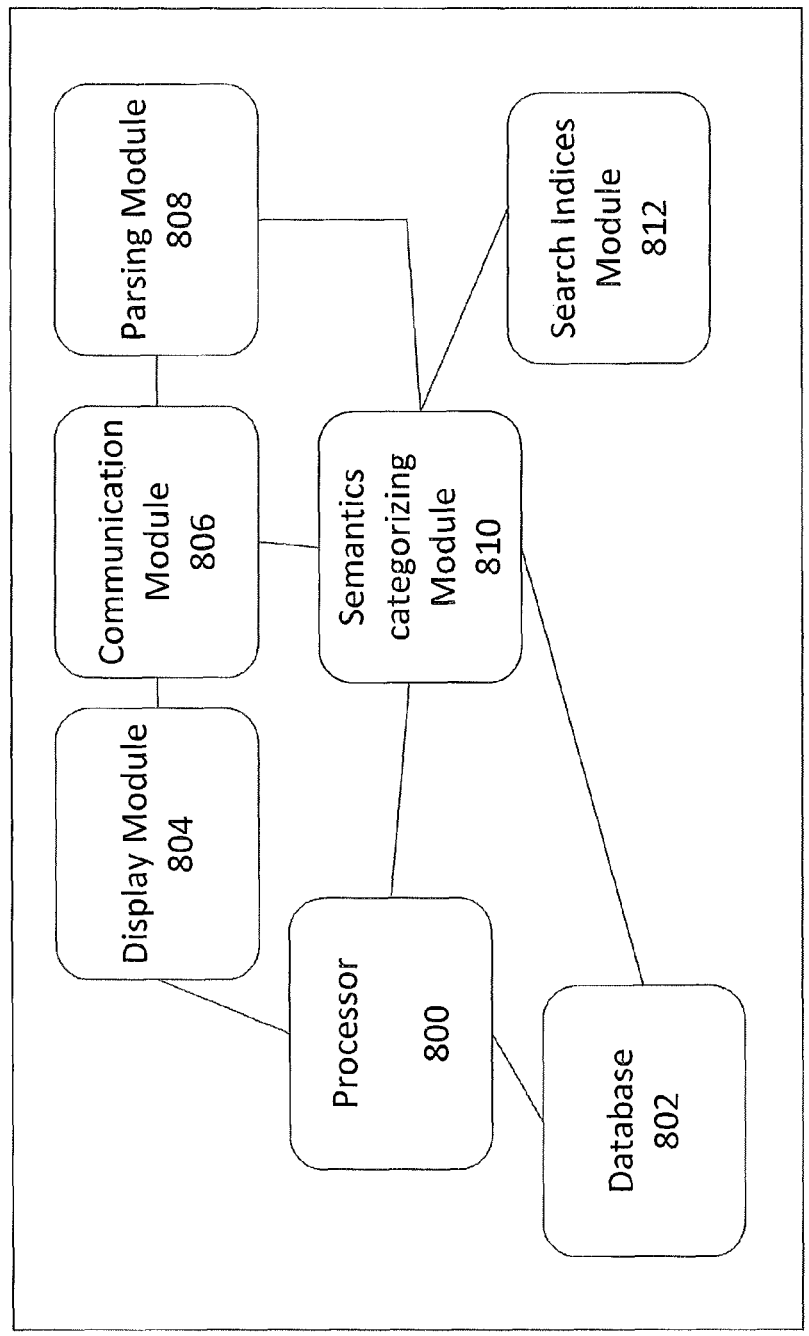
FIG. 8 is a schematic diagram of another embodiment of a server for use in the system for syntactic searching.

User: "Let's take a look at LG" (Search term—LG 4K TV) Turning to FIG. 8, another embodiment of the server 102 is shown. In the current embodiment, the server 102 includes a processor 800 along with a database 802. The server 102 may further include a display module 804, a communication module 806, a parsing or NLP module 808, a semantics categorizing module 810 and a search indices module 812.

The display module 804 may generate the screens that are displayed on a user's computer, or device that they are using to interact with the server. The communication module 806 may control the server's communication such as between the user computer and the server or between the server and other devices. The parsing or NLP module 808 may receive the search terms, such as from the communication module, and then parses the search term so that the terms can be associated with one of the semantic trees by the semantics categorizing module 810. The categorizing module 810 may also determine the different semantic tree categories or the categories may be received as input from a manager of the server 102. The search indices module 812 may be used to store indexes of syntactically tagged terms, words or phrases.

In one embodiment, if communication module may sense that a user wishes to change a search term, the communication module 806 or the processor 800 may then transmit a signal to the semantics categorizing module to retrieve each of the words in the semantic tree that are associated with the selected word. The display module 804 then generates a display to the user device (that is transmitted by the communication module) that allows a user to choose a different word to replace the selected word.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

What is claimed is:

1. A method for syntactic searching for products available from merchants, the method comprising:
   receiving search term comprising multiple individual words from user input at a user device;
   parsing the individual words in the search term using natural language processing (NLP);
   comparing the parsed individual words with words stored in a NLP database including a plurality of previously searched words from prior searches, and pre-populated words into the NLP database based on merchant product information, wherein the previously searched words and the pre-populated words each include relationship information associating selected ones of the previously searched words and the pre-populated words with each other and categorization information that categorizes each of the previously searched words and the pre-populated words;
   causing display, at the user device, of search results based on comparison of words stored in the NLP database;
   receiving, from the user device, a word change request from the user for a selected word among the individual words;
   retrieving one or more alternate words associated with the selected word in a semantic tree;
   displaying, at the user device, both the selected word and the one or more alternate words simultaneously and proximate to the selected word in a list of options for selection as a selected alternate word, the one or more alternate words including only words having a root word that is non-overlapping with respect to the selected word;
   receiving an indication of the selected alternate word from among the one or more alternate words; and
   updating the search results based on inclusion of the selected alternate word in the search term by employing machine learning to update the relationship information and the categorization information,
   wherein parsing the individual words comprises categorizing the individual words as a selected one of group consisting of a root noun, a symbol, an adjective, a number, and a preposition, and
   wherein retrieving the one or more alternate words comprises retrieving only words in a same category as the selected word.

2. The method of claim 1 wherein displaying search results comprises:
   retrieving previously stored search results if parsed individual words are stored in the NLP database; and
   displaying the previous search results.

3. The method of claim 1 wherein displaying search results comprises:
   performing a search based on the search term if the parsed individual words are not stored in the NLP database to generate new search results; and
   displaying the new search results.

4. The method of claim 3 further comprising:
   storing the parsed individual words in the NLP database;
   storing the new search results in the NLP database; and
   associating the new search results with the parsed individual words.

5. The method of claim 1 further comprising:
   storing the search term in the database.

6. The method of claim 1 wherein comparing the parsed individual words comprises:
   grouping the parsed individual words; and
   comparing the group of parsed individual words with the words in the NLP database.

7. The method of claim 6 wherein comparing the group of parsed individual words comprises:
   comparing the parsed individual words with the words in the NLP database; and
   determining if the words in the NLP database have relationships with other words in the NLP database associated with the group of parsed individual words.

8. The method of claim 7 wherein displaying search results comprises:
   retrieving previously stored search results if the words in the NLP database have identical relationships with other words in the NLP database associated with the group of parsed individual words; and
   displaying the previous search results.

9. The method of claim 7 wherein displaying search results comprises:
   performing a new search based on the search term if the words in the NLP database do not have identical relationships with other words in the NLP database associated with the group of parsed individual words to generate new search results; and
   displaying the new search results.

10. A non-transitory computer-readable medium having stored thereon computer executable instructions, that, if executed, cause a computer system to:
    receive search term comprising multiple individual words from user input at a user device;
    parse the individual words in the search term using natural language processing (NLP);
    compare the parsed individual words with words stored in a NLP database including a plurality of previously searched words from prior searches, and pre-populated words into the NLP database based on merchant product information, wherein the previously searched words and the pre-populated words each include relationship information associating selected ones of the previously searched words and the pre-populated words with each other and categorization information that categorizes each of the previously searched words and the pre-populated words;

cause display, at the user device, of search results based on comparison of words stored in the NLP database;

receive, from the user device, a word change request from the user for a selected word among the individual words;

retrieve one or more alternate words associated with the selected word in a semantic tree;

display, at the user device, both the selected word and the one or more alternate words simultaneously and proximate to the selected word in a list of options for selection as a selected alternate word, the one or more alternate words including only words having a root word that is non-overlapping with respect to the selected word;

receive an indication of the selected alternate word from among the one or more alternate words; and update the search results based on inclusion of the selected alternate word in the search term by employing machine learning to update the relationship information and the categorization information, wherein parsing the individual words comprises categorizing the individual words as a selected one of group consisting of a root noun, a symbol, an adjective, a number, and a preposition, and wherein retrieving the one or more alternate words comprises retrieving only words in a same category as the selected word.

11. The computer readable medium of claim 10 wherein the display of search results comprises:
retrieving previously stored search results if parsed individual words are stored in the NLP database; and
displaying the previous search results.

12. The computer readable medium of claim 10 wherein the display of search results comprises:
performing a search based on the search term if the parsed individual words are not stored in the NLP database to generate new search results; and
displaying the new search results.

13. The computer readable medium of claim 12 further comprising computer executable instructions, that, if executed, cause the computer system to:
store the parsed individual words in the NLP database;
store the new search results in the NLP database; and
associate the new search results with the parsed individual words.

14. The computer readable medium of claim 10 further comprising computer executable instructions, that, if executed, cause the computer system to:
store the search term in the database.

15. The method of claim 1, wherein the word change request comprises a cursor hovering over the selected word.

16. The method of claim 1, wherein the word change request comprises a user click on the selected word.

17. The computer readable medium of claim 10, wherein the word change request comprises a cursor hovering over the selected word.

18. The computer readable medium of claim 10, wherein the word change request comprises a user click on the selected word.

* * * * *